US010309649B2

(12) United States Patent
Ono

(10) Patent No.: US 10,309,649 B2
(45) Date of Patent: Jun. 4, 2019

(54) EXHAUST DUCT

(71) Applicant: RINNAI CORPORATION, Nagoya-shi, Aichi (JP)

(72) Inventor: Takahiro Ono, Nagoya (JP)

(73) Assignee: RINNAI CORPORATION, Aichi (JP)

( * ) Notice: Subject to any disclaimer, the term of this patent is extended or adjusted under 35 U.S.C. 154(b) by 274 days.

(21) Appl. No.: 15/591,193

(22) Filed: May 10, 2017

(65) Prior Publication Data

US 2017/0343213 A1 Nov. 30, 2017

(30) Foreign Application Priority Data

May 24, 2016 (JP) .................................. 2016-103164
Jun. 17, 2016 (JP) .................................. 2016-120494

(51) Int. Cl.
*F23M 20/00* (2014.01)
*F23C 9/00* (2006.01)
(Continued)

(52) U.S. Cl.
CPC ............. *F23M 20/005* (2015.01); *F23C 9/00* (2013.01); *F23R 2900/00014* (2013.01);
(Continued)

(58) Field of Classification Search
CPC ..................... F23M 20/005; F23C 9/00; F23R 2900/00014; F24H 1/40; F24H 8/00; F24H 9/1836; Y02B 30/102
(Continued)

(56) References Cited

U.S. PATENT DOCUMENTS 4,922,889 A * 5/1990 Nuesmeyer ............... F23B 1/30
110/283
2015/0354834 A1* 12/2015 Barone ................... F24H 3/065
431/2

(Continued)

FOREIGN PATENT DOCUMENTS

JP  2013-134010 A  7/2013

*Primary Examiner* — Gregory L Huson
*Assistant Examiner* — Daniel E Namay
(74) *Attorney, Agent, or Firm* — Cermak Nakajima & McGowan LLP; Tomoko Nakajima

(57) ABSTRACT

[Problems to be Solved] An exhaust duct (4) for assembly into a combustion apparatus has: a burner (1) to eject air-fuel mixture downward; and a combustion box (3) disposed on a lower side of the burner (1). The exhaust duct includes: a riser duct section (42) elongated in a vertical direction and having, at a lower portion thereof, an inlet port (41) connected to an exhaust port (35) for combustion gas which is opened in a lower portion of the combustion box (3); and a flat horizontal duct section (43) bent at an upper end of the riser duct section (42) so as to be elongated forward. By restraining the resonance of an upper wall part (431) and a lower wall part (432) of the horizontal duct section (43), noises due to resonance sounds are reduced.
[Solving Means] The natural frequencies in an upper wall part (431) and the lower wall part (432) of the horizontal duct section (43) are varied from each other. For example, the lower wall part (432) is fixed to a burner body (11) in order to vary the natural frequencies of the upper wall part (431) and of the lower wall part (432) from each other.

5 Claims, 5 Drawing Sheets

(51) Int. Cl.
*F24H 1/40* (2006.01)
*F24H 8/00* (2006.01)
*F24H 9/18* (2006.01)

(52) U.S. Cl.
CPC ............... *F24H 1/40* (2013.01); *F24H 8/00* (2013.01); *F24H 9/1836* (2013.01); *Y02B 30/102* (2013.01)

(58) Field of Classification Search
USPC ........................................................ 431/114
See application file for complete search history.

(56) References Cited

U.S. PATENT DOCUMENTS

| | | | | |
|---|---|---|---|---|
| 2015/0362217 A1* | 12/2015 | Dresser | ................... | F23N 3/082 237/2 A |
| 2015/0369495 A1* | 12/2015 | Maricic | ................ | F23D 14/045 126/116 A |
| 2015/0369518 A1* | 12/2015 | Dresner | ................. | F24H 8/006 126/113 |

* cited by examiner

EXHAUST DUCT

BACKGROUND OF THE INVENTION

1. Technical Field

The present invention relates to an exhaust duct for assembly into a combustion apparatus which is provided with: a burner to eject air-fuel mixture downward for combustion; and a combustion box which is disposed on a lower side of the burner and which houses therein a heat exchanger to be heated by combustion gas.

2. Background Art

As this kind of exhaust duct, there is known one which is provided with: a riser duct section elongated in a vertical direction and having, at a lower portion thereof, an inlet port which is connected to an exhaust port for combustion gas and which is opened in a lower portion of the combustion box; and a flat horizontal duct section bent at an upper end of the riser duct section so as to be elongated forward (see, e.g., JP-A-2013-134010).

In this kind of exhaust duct, the combustion gas enters from the riser duct section into the horizontal duct section with a motion component in the vertical direction. Therefore, the upper wall part (i.e., "upper-wall" part) and the lower wall part (i.e., "lower-wall" part) of the horizontal duct section are likely to give rise to vibrations. It is to be noted here that the upper wall part and the lower wall part of the horizontal duct section have similar natural frequencies. Then, among the gaseous vibrations of various frequencies contained in the combustion gas that passes through the exhaust duct, the upper wall part and the lower wall part resonate, like a drum, with the gaseous vibrations of frequencies corresponding to the natural frequencies of the upper wall part and of the lower wall part. As a result, the noises due to the resonance of the frequencies in question get larger.

SUMMARY

Problems that the Invention is to Solve

In view of the above-mentioned points, this invention has an advantage in providing an exhaust duct in which, by restraining (or suppressing) the resonance between the upper wall part and the lower wall part of the horizontal duct section, the noises can be reduced.

Means to Solve the Problems

In order to solve the above-mentioned problems, this invention is an exhaust duct for assembly into a combustion apparatus. The combustion apparatus comprises: a burner to eject air-fuel mixture downward for combustion; and a combustion box which is disposed on a lower side of the burner and which houses therein a heat exchanger to be heated by combustion gas. The exhaust duct comprises: a riser duct section elongated in a vertical direction and having, at a lower portion thereof, an inlet port which is connected to an exhaust port for combustion gas and which is opened in a lower portion of the combustion box; and a flat horizontal duct section bent at an upper end of the riser duct section so as to be elongated forward. In the above-described exhaust duct, the first invention of this application is that natural frequencies in an upper wall part of the horizontal duct section and in a lower wall part of the horizontal duct section are varied from each other. The second invention of this application is that the horizontal duct section is divided into a plurality of segments, the plurality of segments being grouped into segments of a first group and segments of a second group such that segments of respective groups are not mutually adjacent to each other. In order to vary the natural frequencies in the first segment and in the second segment of an upper wall part and of a lower wall part, respectively, of the horizontal duct section, the first segment has a reinforcing rib formed in the upper wall part, and the second segment has a reinforcing rib formed in the lower wall part.

According to the first invention, as a result of arranging such that the upper wall part and the lower wall part of the horizontal duct section have natural frequencies that are different from each other, the resonance of the upper wall part and the lower wall part is restrained and noises due to the resonance sound can be reduced. Further, according to the second invention, since the upper wall part and the lower wall part in the first segment and in the second segment of the horizontal duct section have natural frequencies that are different from each other, the resonance between the upper wall part and the lower wall part in each of the first segment and the second segment is restrained. The noises due to resonance sounds can thus be reduced.

By the way, in the first invention, in order to vary the natural frequencies of the upper wall part and the lower wall part from each other, one of the upper wall part and the lower wall part of the horizontal duct section is fixed to another constituent element. Or else, one of the upper wall part and the lower wall part of the horizontal duct section is provided with a stiffening rib, or the upper wall part and the lower wall part of the horizontal duct section are made of materials of different specific gravities.

PREFERRED EMBODIMENTS FOR CARRYING OUT THE INVENTION

Figure 1:
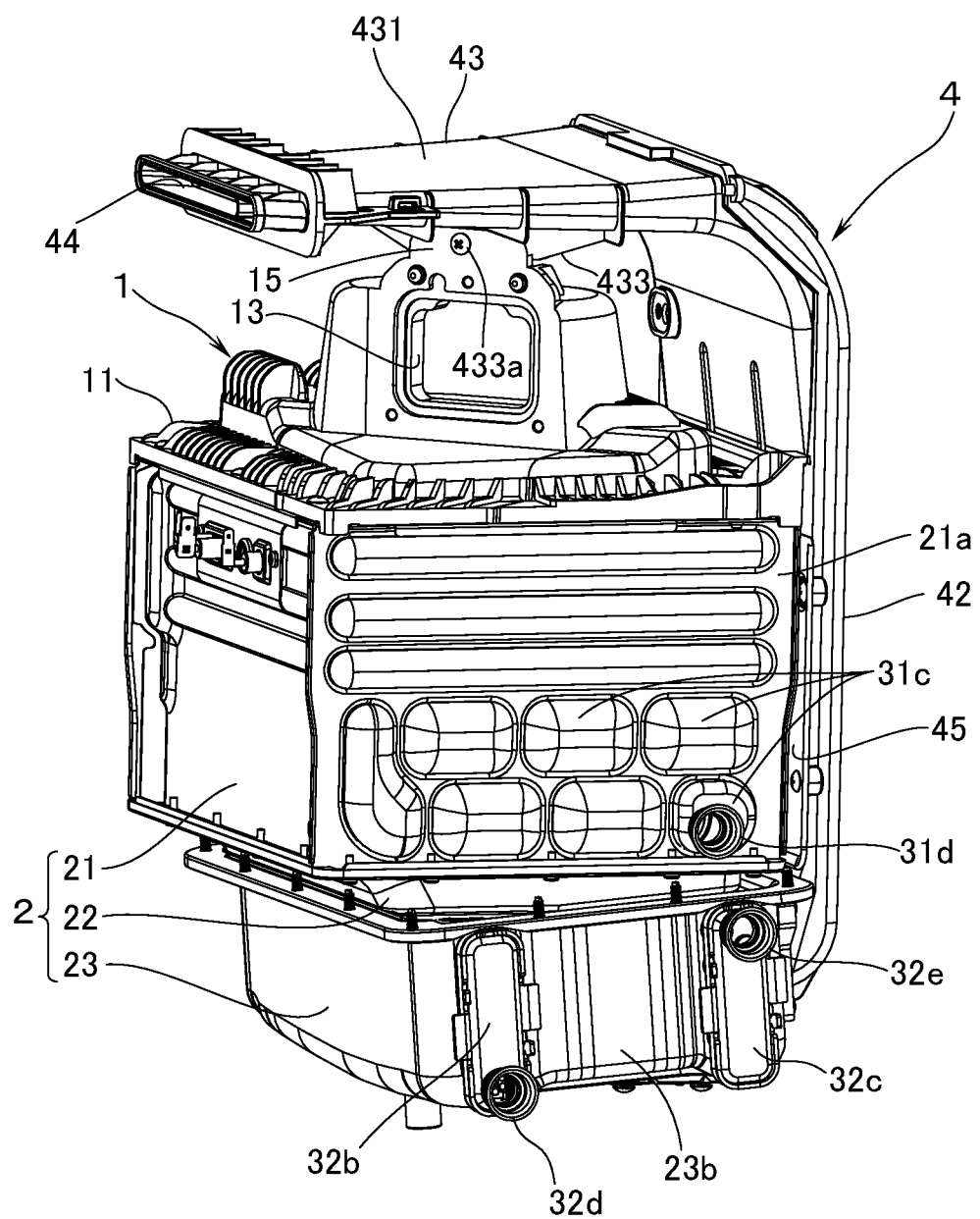
FIG. 1 is a perspective view of a combustion apparatus provided with the exhaust duct according to a first embodiment of this invention.
Figure 2:
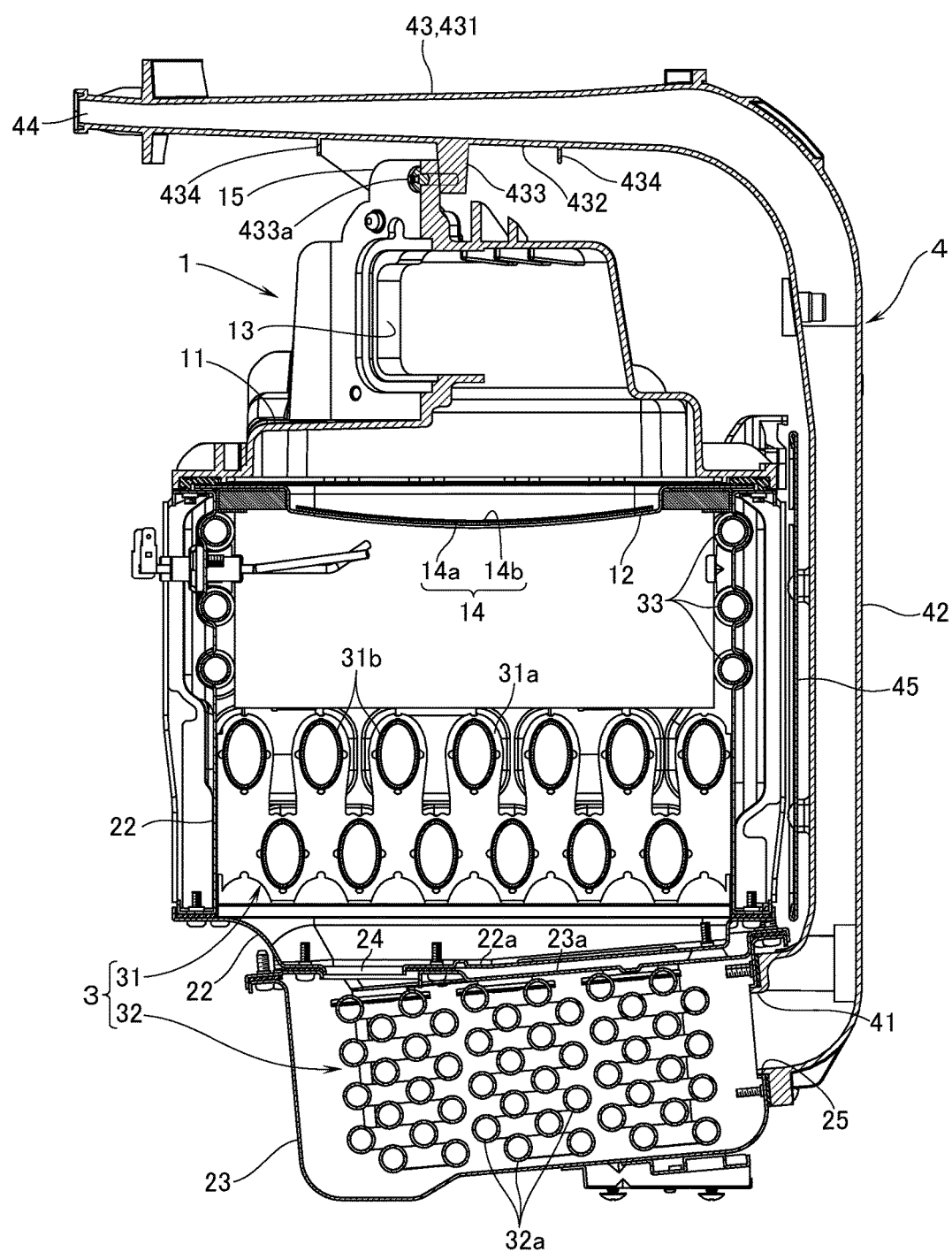
FIG. 2 is a side view shown in section of the combustion apparatus in FIG. 1.

FIGS. 1 and 2 show a combustion apparatus comprising a heat source appliance. This combustion apparatus comprises: a burner 1 which ejects air-fuel mixture downward for combustion; a combustion box 3 which is disposed on a lower side of the burner and which houses therein a heat exchanger to be heated by combustion gas that is generated by combustion of the air-fuel mixture; and an exhaust duct 4 for exhausting the combustion gas to the outside.

The burner 1 is provided with: a box-shaped burner body 11 which opens downward; and a combustion plate 12 which covers a downward opening surface of the burner body 11. The burner body 11 has, on an upper portion thereof, an inlet port 13 which opens sideways. In this arrangement, the air-fuel mixture is supplied from a fan (not illustrated) through the inlet port 13 into the burner body 11. This air-fuel mixture is ejected downward from an air-fuel mixture ejection portion 14 disposed in the combustion plate 12, thereby performing totally primary air combustion. The combustion plate 12 has a large opening in the central portion thereof. Textile fabric 14a of heat-resistant fibers is mounted into this opening, and a distribution plate 14b having formed therein a multiplicity of distribution holes is overlapped with the textile fabric 14a. In this manner, the air-fuel mixture ejection portion 14 is constituted by the textile fabric 14a and the distribution plate 14b.

The combustion box 2 is constituted by: an upper box 21 which is open on both upper and lower surfaces and which is fastened, at an upper end portion thereof, to a periphery of the lower surface of the burner body 11; a flat and dish-like intermediate box 22 which is fastened to the lower end of the upper box 21; and a lower box 23 which is blocked at both the upper and lower surfaces and which has an upper plate portion 23a to be fastened to the bottom plate portion 22a of the intermediate box 22. A front portion of the bottom plate portion 22a of the intermediate box 22 and the front portion of the upper plate portion 23a of the lower box 23 are provided with a vent hole 24 which brings into communication the inside space of the intermediate box 22 and the inside space of the lower box 23. Further, at a lower portion of the combustion box 2, i.e., in the lower box 23, the rear surface thereof is provided with an exhaust port 25. It is thus so arranged that the combustion gas flows from inside the upper box 21 through the inside of the intermediate box 22, the vent hole 24, the inside of the lower box 23 and the exhaust port 25 into the exhaust duct 4.

The heat exchanger 3 is constituted by: a main heat exchanger 31 of fin-and-tube type which is disposed in the upper box 21 and which is made up of a multiplicity of heat-absorbing fins 31a, and a plurality of heat-absorbing pipes 31b which penetrate through the heat-absorbing fins 31a; and a subsidiary heat exchanger 32 of latent-heat recovery type which is disposed inside the lower box 23 and which is made up of a plurality of upper and lower heat-absorbing pipes 32a elongated back and forth in a snaking manner. On an outside surface of the side plate portion 21a on laterally one side and on laterally the other side of the upper box 21, there are provided a plurality of connection lids 31c which define, between each of the side plates 21a, connection passages of the adjoining two heat-absorbing pipes 31b, 31b. All the heat-absorbing pipes 31b are thus arranged to be connected in series. Further, a connection port 31d is provided in a connection lid 31c which defines, between the side plate 21a on one lateral side, a connection passage connected to the heat-absorbing pipes 31b on the upstream end.

Further, a side plate portion 23b on one lateral side of the lower box 23 is provided with: an inlet-side header lid 32b which defines, between the side plate portion 23b, a connection passage connecting together front end portions of a plurality of upper and lower heat-absorbing pipes 32a of the subsidiary heat exchanger 32; and an outlet-side header lid 32c which defines, between the side plate portion 23b, a connection passage connecting together the rear end portions of a plurality of upper and lower heat-absorbing pipes 32a. An inlet-side header lid 32b is provided with a water inlet port 32d to which is connected a water supply passage, and an outlet-side header lid 32c is provided with a connection port 32e to which is connected the above-mentioned connection port 31d through a piping (not illustrated). It is thus so arranged that the water from the water supply passage flows, via the subsidiary heat exchanger 32, to the main heat exchanger 31. Further, in that portion of the upper box 21 which is above the main heat exchanger 31, there is provided a water jacket 33 which is constituted by a plurality of upper and lower water pipes in which flows the water passing through the main heat exchanger 31, to prevent the said portion from being overheated. On a downstream end of the water jacket 33, there is connected the hot water supply passage.

Figure 3:
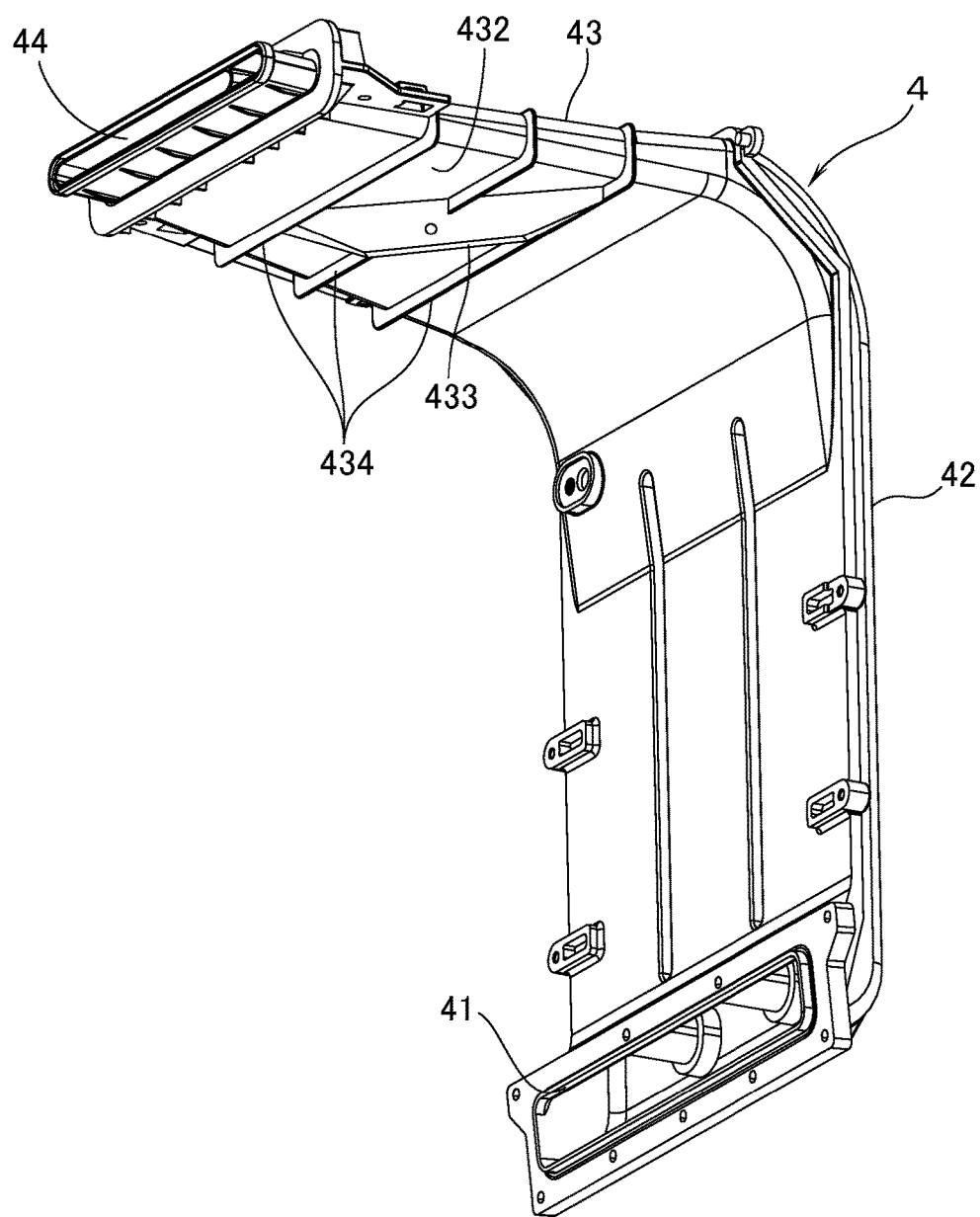
FIG. 3 is a perspective view, as seen obliquely from below, of the exhaust duct according to the first embodiment.

With reference also to FIG. 3, the exhaust duct 4 is provided with: a vertically elongated riser duct section 42 having that inlet port 41 at a bottom front surface which is connected to the exhaust port 25; and a flat horizontal duct section 43 which is bent at an upper end of the riser duct section 42 so as to be elongated forward. It is thus so arranged that the combustion gas from the exhaust port 25 is exhausted to the outside from an outlet 44 at a front end of the horizontal duct section 43, through the riser duct section 42 and the horizontal duct section 43. The exhaust duct 4 is made of resin. In order to restrain the heat input from the combustion box 3 into the riser duct section 42 positioned on the rear side of the combustion box 3, there is disposed a heat shield plate 45 on the front side of the riser duct section 42.

By the way, in the exhaust duct 4 having the horizontal duct section 43 at the upper end of the riser duct section 42, the combustion gas enters from the riser duct section 42 into the horizontal duct section 43 with a motion component in the vertical direction. Therefore, an upper wall part 431 and a lower wall part 432 of the horizontal duct section 43 come to be easily subjected to vibration. In case the upper wall part 431 and the lower wall part 432 have similar natural frequencies, among the gas vibrations of various kinds of frequencies contained in the combustion gas to flow through the exhaust duct 4, the upper wall part 431 and the lower wall part 432 will vibrate like a drum relative to the gas vibrations of frequencies that coincide with the natural frequencies of the upper wall part 431 and the lower wall part 432. The noises by this resonance sound of these natural frequencies will become larger.

As a solution, in this embodiment, the natural frequencies of the upper wall part 431 and the lower wall part 432 of the horizontal duct section 43 were arranged to be different from each other. In concrete, the lower wall part 432 of the horizontal duct section 43 was fixed to the burner body 11 that is another (foreign) member so that the natural frequency of the lower wall part 432 was made higher than the natural frequency of the upper wall portion 431. In other words, on the upper surface of the burner body 11, there was formed a projection portion 15 that projects upward of the inlet port 13, and also on the lower wall part 432, there was formed a rib 433 that overlapped with the projection portion 15. The rib 433 was then fixed to the projection portion 15 with screws 433a. By fixing the lower wall part 432 to the burner body 11 in this manner so that the natural frequencies of the upper wall part 431 and of the lower wall part 432 are varied from each other, the resonance between the upper wall part 431 and the lower wall part 432 is restrained, thereby reducing the noises due to the resonance.

By the way, in order to stiffen or reinforce the portion where the rib 433 is disposed, three (central, front and back) stiffening ribs 434 are disposed, at a distance from one another, in a manner to cross the portion of disposing the reinforcing rib 433. However, unless the rib 433 is fixed to the projection portion 15, the rib 433 and the ridges 434 alone cannot make the natural frequency of the lower wall part 432 so much higher than the natural frequency of the upper wall part 431. As a consequence, the resonance of the upper wall part 431 and the lower wall part 432 cannot be restrained sufficiently.

Figure 4A:
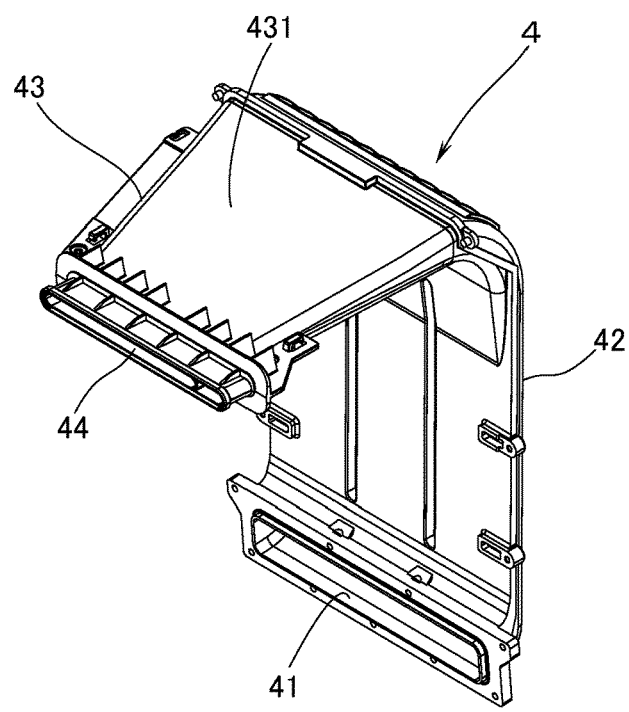
FIG. 4A is a perspective view, as seen obliquely from above, of the exhaust duct according to a second embodiment.
Figure 4B:
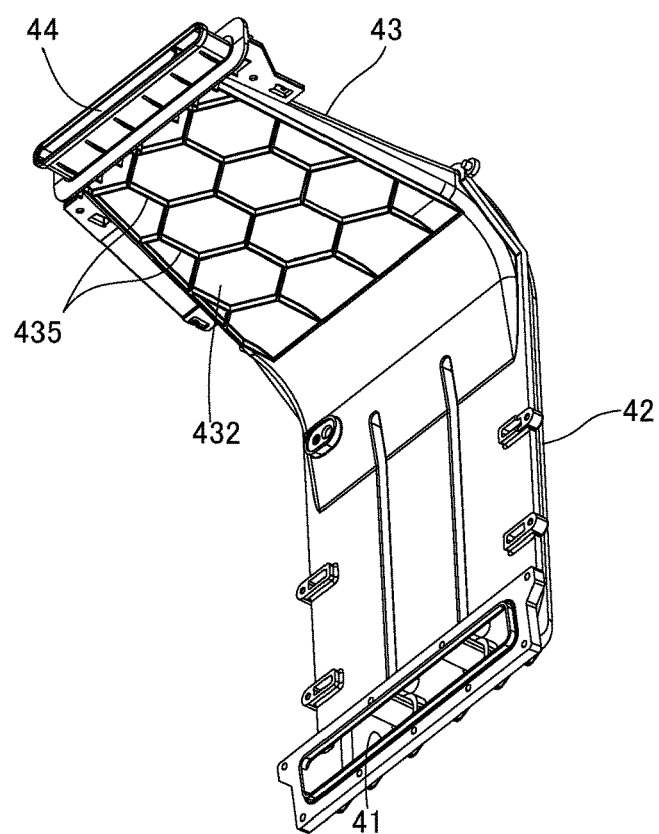
FIG. 4B is a perspective view, as seen obliquely from below, of the exhaust duct according to the second embodiment.

Next, with reference to FIGS. 4A and 4B, a description will be made of an exhaust duct 4 according to a second embodiment. The basic construction of the exhaust duct 4 according to the second embodiment is not particularly different from that of the above-mentioned first embodiment. Therefore, the same reference numerals are assigned to the similar members and positions as those in the first embodiment.

In the second embodiment, the lower wall part 432 of the horizontal duct section 43 is provided, over the entire surface thereof, with reinforcing ribs of hexagonal lattice pattern 435. According to this arrangement, even if the lower wall part 432 is not fixed to the burner body 11 contrary to the case of the first embodiment, the difference between the natural frequency of the lower wall part 432 and the natural frequency of the upper wall part 431 becomes larger. As a consequence, the resonance between the upper wall part 431 and the lower wall part 432 can be sufficiently restrained. In the second embodiment, it is also possible to provide the lower wall part 432 of the horizontal duct section 43 with such a rib for fixing to the burner body 11 as is the case with the first embodiment.

Figure 5A:
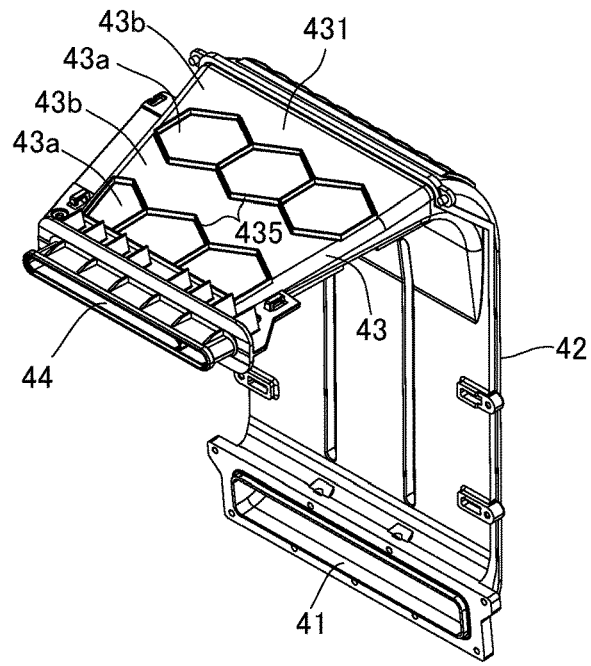
FIG. 5A is a perspective view, as seen obliquely from above, of the exhaust duct according to a third embodiment.
Figure 5B:
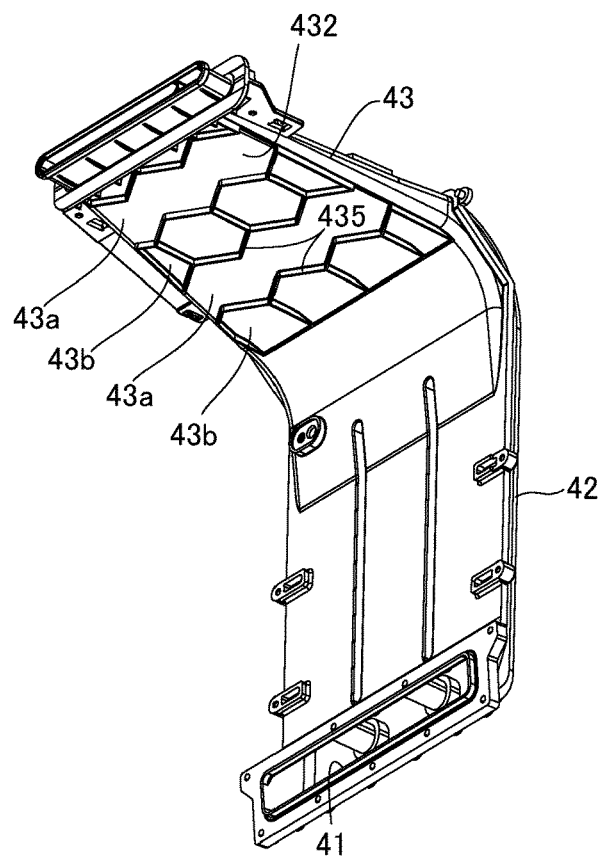
FIG. 5B is a perspective view, as seen obliquely from below, of the exhaust duct according to the third embodiment.

Next, a description will be made of an exhaust duct 4 according to a third embodiment as shown in FIGS. 5A and 5B. The basic construction of the exhaust duct 4 according to the third embodiment is not particularly different from that of the above-mentioned first embodiment. Therefore, the same reference numerals are assigned to the similar members and positions as those in the first embodiment.

In the third embodiment, the horizontal duct section 43 is grouped into a plurality of segments, e.g., into four segments of two groups arrayed in the back and forth direction. In this example, each group is made up of two sets of first segments 43a, 43a and two sets of second segments 43b, 43b, arranged such that the segments of respective groups are not adjacent to each other (i.e., free from being mutually adjacent to each other). In the first segment 43a, the upper wall part 431 is provided with reinforcing ribs 435 in the shape of a hexagonal lattice pattern, and in the second segment 43b, the lower wall part 432 is provided with reinforcing ribs 435 in the shape of a hexagonal lattice pattern.

According to the third embodiment, in the first segment 43a of the horizontal duct section 43, the natural frequency of the upper wall part 431 becomes higher than the natural frequency of the lower wall part 432. In the second segment 43b, on the other hand, the natural frequency of the lower wall part 432 becomes higher than the natural frequency of the upper wall part 431. As a result, in each of the first and the second segments 43a, 43b, resonance of the upper wall part 431 and the lower wall part 432 is restrained, thereby reducing the noises due to resonance sound.

Explanations have so far been made of embodiments of this invention with reference to the figures. This invention shall, however, be not limited to the above. For example, the upper wall part 431 and the lower wall part 432 of the horizontal duct section 43 may be formed of material with different specific gravities so that the natural frequency of the upper wall part 431 and the lower wall part 432 can be varied. Further, in the above-mentioned embodiments, although the reinforcing ribs 435 are formed in the shape of hexagonal lattice pattern, the shape of the reinforcing ribs 435 may be arbitrary. Further, in the above-mentioned embodiments, the exhaust port 25 is formed in the rear surface of the lower portion of the combustion box 2. The exhaust port may alternatively be formed in the lower surface of the lower portion of the combustion box 2, and the lower portion of the riser duct section 41 of the exhaust duct 4 is bent into an L-shape so as to lie along the lower surface of the combustion box 2, and an inlet to be connected to the exhaust port may be formed on the upper surface of this bent portion.

EXPLANATION OF MARKS

1 burner
2 combustion box
3 heat exchanger
4 exhaust duct
41 inlet port
42 riser duct section
43 horizontal duct section
43a first segment
43b second segment
431 upper wall part (upper-wall part)
432 lower wall part (lower-wall part)
435 reinforcing rib

What is claimed is:

1. An exhaust duct for assembly into a combustion apparatus, said combustion apparatus comprising: a burner to eject air-fuel mixture downward for combustion; and a combustion box which is disposed on a lower side of the burner and which houses therein a heat exchanger to be heated by combustion gas, said exhaust duct comprising:

a riser duct section elongated in a vertical direction and having, at a lower portion thereof, an inlet port which is connected to an exhaust port for combustion gas and which is opened in a lower portion of the combustion box; and a flat horizontal duct section bent at an upper end of the riser duct section so as to be elongated forward, wherein natural frequencies in an upper wall part and in a lower wall part of the horizontal duct section are varied from each other.

2. The exhaust duct according to claim 1, wherein one of the upper wall part and the lower wall part of the horizontal duct section is fixed to another constituent element in order to vary the natural frequencies in the upper wall part and in the lower wall part from each other.

3. The exhaust duct according to claim 1, wherein one of the upper wall part and the lower wall part of the horizontal duct section is provided with a reinforcing rib in order to vary the natural frequencies in the upper wall part and in the lower wall part from each other.

4. The exhaust duct according to claim 1, wherein the upper wall part and the lower wall part of the horizontal duct section are made of materials of different specific gravities in order to vary the natural frequencies in the upper wall part and in the lower wall part from each other.

5. An exhaust duct for assembly into a combustion apparatus, said combustion apparatus comprising: a burner to eject air-fuel mixture downward for combustion; and a combustion box which is disposed on a lower side of the burner and which houses therein a heat exchanger to be heated by combustion gas, said exhaust duct comprising:

a riser duct section elongated in a vertical direction and having, at a lower portion thereof, an inlet port which is connected to an exhaust port for combustion gas which is opened in a lower portion of the combustion box; and a flat horizontal duct section bent at an upper end of the riser duct section so as to be elongated forward, wherein: the horizontal duct section is divided into a plurality of segments, said plurality of segments being grouped into segments of a first group and segments of a second group such that segments of respective groups are free from being mutually adjacent to each other, and;

in order to vary natural frequencies in the first segment and in the second segment of an upper wall part and of a lower wall part, respectively, of the horizontal duct section, the first segment has a reinforcing rib formed in the upper wall part, and the second segment has a reinforcing rib formed in the lower wall part.

* * * * *